April 2, 1968        G. FRANZEN        3,375,648

UNWINDING AID FOR DOUBLE TWIST SPINDLES

Filed Aug. 25, 1965        5 Sheets-Sheet 1

Inventor:
Gustav Franzen
By Cushman, Darby & Cushman
Attorneys

April 2, 1968  G. FRANZEN  3,375,648

UNWINDING AID FOR DOUBLE TWIST SPINDLES

Filed Aug. 25, 1965  5 Sheets-Sheet 4

Inventor:
Gustav Franzen
By Cushman, Darby & Cushman
Attorneys

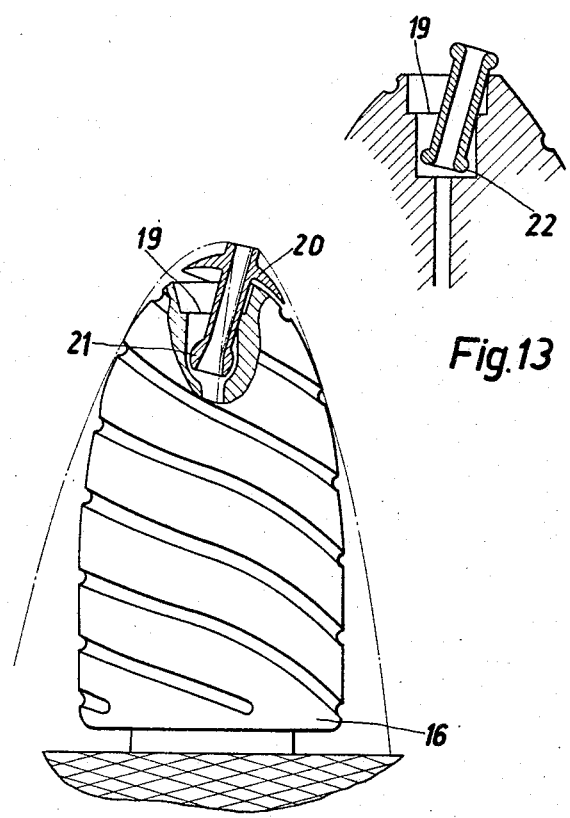

United States Patent Office 3,375,648
Patented Apr. 2, 1968

3,375,648
UNWINDING AID FOR DOUBLE TWIST SPINDLES
Gustav Franzen, Neersen, near Krefeld, Germany, assignor to Palitex Project-Company, G.m.b.H., Krefeld, Germany
Filed Aug. 25, 1965, Ser. No. 482,383
Claims priority, application Germany, Aug. 26, 1964, N 25,422
15 Claims. (Cl. 57—58.83)

ABSTRACT OF THE DISCLOSURE

An unwinding aid on the yarn entry tube of a double twist spindle, comprising a yarn guiding member having external means superficially thereof winding towards the inlet end of the tube for intersecting and guiding the yarn between the bobbin and the said inlet end.

---

Figure 4:
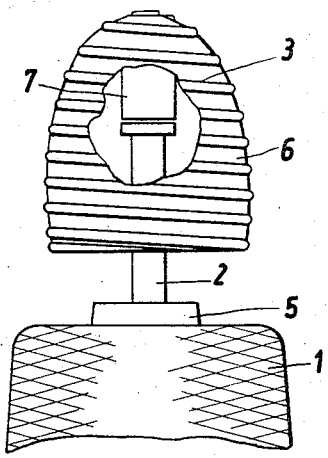

The invention relates to an unwinding aid for double twist spindles, particularly for spindles which carry two or more winding-off bobbins, the contemplated unwinding aid being attachable to the yarn entry tube.

When using double twist spindles, irrespectively as to whether they carry one or more bobbins, it is a nuisance that the yarn or yarns may lag in their gyratory movement and thus tend to wind themselves around the inlet tube. Moreover, when several yarns unwind at the same time an additional difficulty that may arise is that the individual gyrating yarns overtake and interfere with each other. Unwinding aids have already been proposed for overcoming these difficulties, which give rise to the formation of so-called corkscrews. Apart from rotating twisting blades and the like, devices attached to the entry tube have also already been used. However, in effect these known devices are not entirely satisfactory because, on the one hand, they fail to prevent the described kind of trouble which arises when the yarns overtake each other and, on the other hand, they are not entirely successful in stopping the yarns from twisting on to the entry tube.

It is the object of the present invention to provide an unwinding aid which eliminates the shortcomings of known devices, and which assures that one or more yarns will run into the entry tube satisfactorily. The present invention solves this problem by providing external means winding and tapering towards the inlet end of the said tube for intersecting and guiding the yarn between the bobbin and the said inlet end. Preferably the said means are pitched to wind and rise in the direction of throw of the entering yarn to the smallest diameter at the yarn entery end of said tube. The winding, e.g., as turns of a tapering coil or coils or as separate spaced windings which each traverse less than 360°, and together form a tapering group, operate to guide the yarn and it transpires that the rise or pitch of the turns or windings must bear a certain relationship to the speed of the running yarn and should be so selected that the yarn makes an angle with the individual turns or windings, which must be substantially less than 90° but never so small that the running yarn is parallel with the turns or windings. The steeper of the pitch of the coil between these two limits the more necessary it becomes to provide two or more spaced coils or windings.

Occasionally it may be important not to assist the unwinding yarn or yarns but slightly to brake the same, particularly a yarn which tends to gain on the other or others. In a further development of the inventive idea this is achieved by providing that the turns on the windings rise contrary to the direction of throw of the entering yarn and by enlarging, particularly widening, the effective surface of the coil or windings.

The coil or windings according to the invention may be constituted by wound or coiled wire. Alternatively a cone-shaped body may be provided and the windings or coil applied to its surface, for instance in the form of a wire and the like welded, soldered or adhesively affixed to the cone. Moreover, a coned body may be used and the windings or coil may be machined into its surface. For example, a cast body with an appropriately shaped conical surface could be thus used for the purpose. Alternatively the surface of such a body may be spirally grooved.

The external contour of the coil or windings may have several alternative shapes. However, in every case the bottom diameter must be larger than the upper diameter of the tubular core of the winding-off bobbin with which the unwinding aid is to co-operate. The diameter decreases from the stated diameter to the end adjacent the entry tube. This decrease may be at a constant rate defining a straight cone. However, other shapes are feasible, e.g., mushroom-like, pine-tree cone shape, spherical section, or sugar loaf or the like form. The term "conoidal" used in the claims hereof is intended to include any such shape.

In the case of spindles mounting two or more bobbins, the unwinding aid proposed by the present invention could also be provided between two winding-off bobbins and in this position it would fulfill substantially the same function as in the neighborhood of the yarn entry tube. The arrangement must then be such that the major diameter of the unwinding aid exceeds the maximum diameter of the tubular cores of the winding-off bobbins.

Unwinding aids of the above proposed kind eliminate the several difficulties experienced when known devices of such a kind are used. Particularly twisting of the yarn around the entry tube is thus prevented and, whenever the yarns are non-uniformly drawn off in doubling operations, they are able freely to overtake each other without causing trouble.

The manner in which the yarn runs off the bobbin can be advantageously influenced if the upper end of the yarn entry tube is movably inserted into the main member.

The drawings illustrate preferred embodiments of the invention in part sectional views.

In each of the drawings 1 is the upper winding-off bobbin and 2 is the yarn entry tube.

Figure 1:
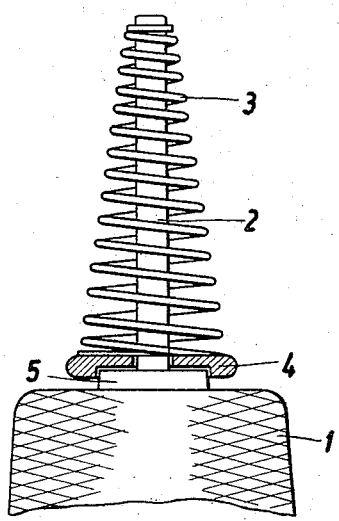

The simplest embodiment of the invention consists of a wire coil of a kind illustrated in FIG. 1 at 3. The wire coil is simply mounted on the tube 2. 4 is a plate to which the wire coil is attached. The diameter of the bottom turn of the helix 3 and of the plate 4 must exceed the diameter at the top of the tubular core 5 of the winding-off bobbin 1.

In FIG. 1 the diameter of the coil decreases at a uniform rate from the first turn adjacent the plate 4 to the last turn at the top in the region of the entry end of the yarn entry tube 2, so that the overall shape of the coil defines a completely uniform cone.

Figure 2:
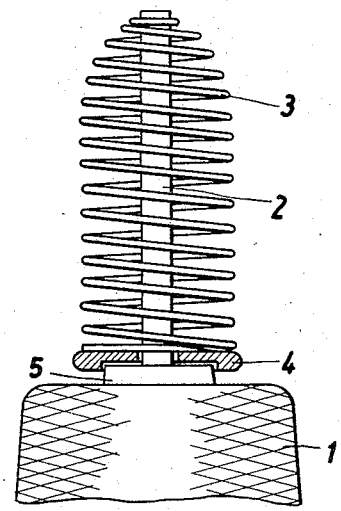

In FIG. 2 the diameter of the wire coil 3 does not at first decrease from the end adjacent the plate 4, the decrease of the diameter of the coil being confined to the extreme upper end.

Figure 3:
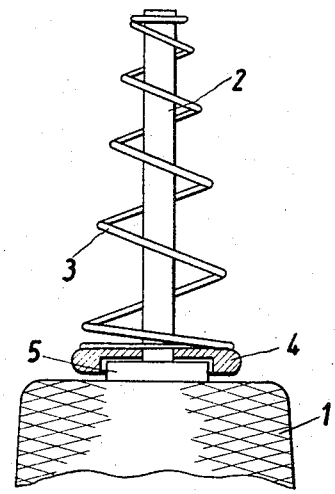

In principle FIG. 3 illustrates the same form of construction as FIG. 1 but the pitch of the turns of the coil is different to that in FIG. 1. In this connection it may be observed that the yarn which unwinds from bobbin 1 travels to the end of the entry tube 2 along a path which is likewise coiled. The coil 3 which is to serve as an unwinding aid must be so shaped that each turn makes an angle of less than 90° with the running yarn. On the other hand, care must be taken to see that the turns of the coil 3 are not parallel to the coils formed by the running yarn. The most satisfactory pitch for the turns of the coil 3 is in practice midway between these two extremes. If for any reason it were desirable to use a very steeply pitched unwinding aid two or more coils would have to be interspaced.

Instead of using coils constituted by a coiled wire conical or conoidal bodies may be provided, as illustrated in FIG. 4 to 9, which other carry the coil or coils or windings on their surface or have the coil or coils or windings machined into their surface in some suitable way. For instance, FIG. 4 shows a body 6 which in shape substantially resembles a pine-tree cone which carries a coil 3 on its surface. 7 is the tubular core by means of which this body 6 is mounted on the end of tube 2. The other embodiments of similar kind that will be hereinafter described are correspondingly mounted.

Figure 5:
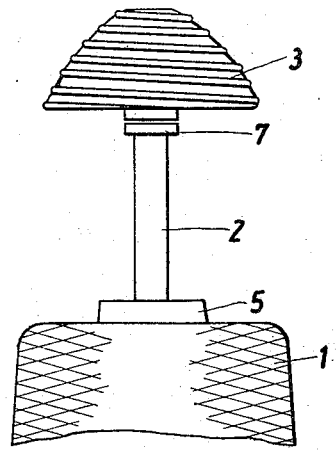

FIG. 5 illustrates a body 7 of mushroom shape which carries a coil 3.

Figure 6:
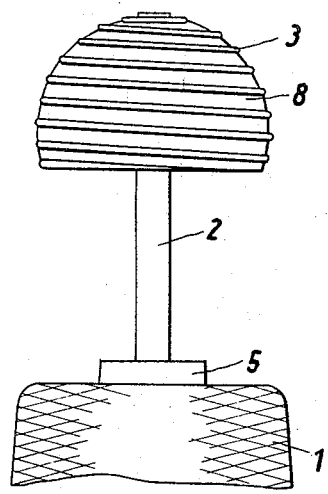

In FIG. 6 the body 8 has the shape of a spherical section to which the coil 3 is attached.

Figure 7:
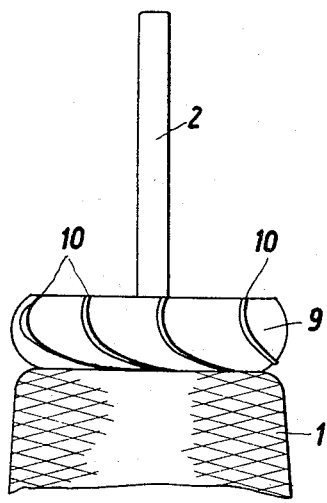
Figure 8:
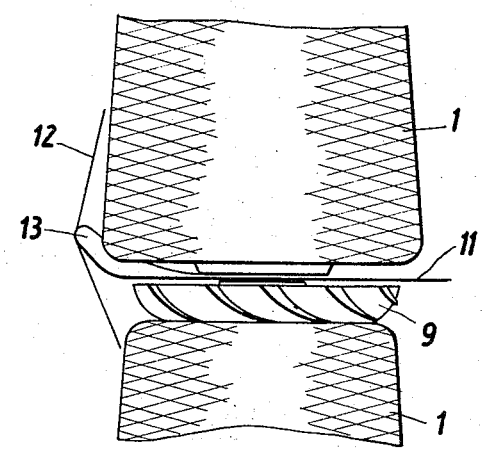

FIG. 7 illustrates a somewhat different shape. The body 9 has the form of a ring with a bulbous edge to which several interspaced windings 10 are applied. A body 9 of this type is particularly suitable as an unwinding aid between the upper bobbin 1 and the lower bobbin 1' on a spindle carrying two bobbins as illustrated in FIG. 8. In this arrangement a disc 11 is provided between the bottom bobbin 1' an dthe upper bobbin 1. The running yarn 12 deforms the rim of this disc as indicated at 13. Such a disc 11 forms no part of the present invention, but it can be conveniently used in conjunction with an unwinding aid according to the invention.

Figure 9:
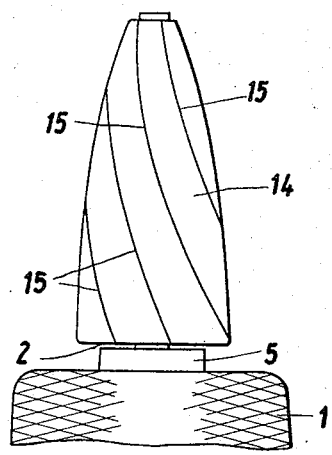

FIG. 9 shows a body 14 of a shape roughly resembling that of a sugar leaf. The peripheral surface of this body carries several windings 15 because the pitch of each winding is particularly steep. The multiple interspaced windings 15 are intended to prevent the yarn from pulling into the gap between two windings. Nevertheless, the yarn will make only point contact with the body of such an unwinding aid. In a body of the kind illustrated in FIG. 9 the coils may be conveniently formed by providing a cast or injection moulded metal, plastics or like body formed with a surface having the desired contours.

Figure 9A:
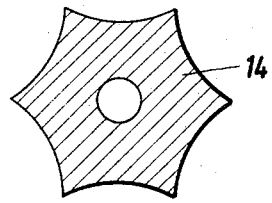
Figure 9B:
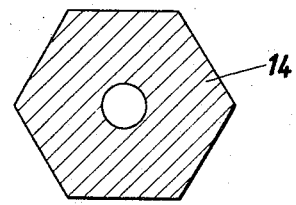
Figure 9C:
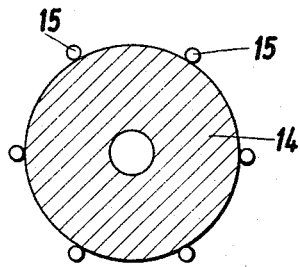
Figure 9D:
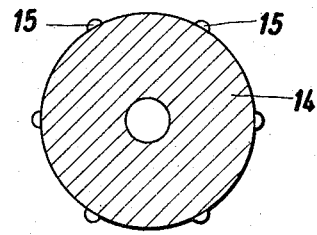

FIGS. 9a and 9b are bodies 14 of such a kind with appropriate contours. FIGS. 9c and 9d show bodies 14 of cross sectionally circular shape to which the required windings 15 have been attached for instance in the form of wires soldered or welded on to the same. Alternatively, the wires may be fixed with the aid of an adhesive. Moreover, the wires could be replaced by bands which offer a wider supporting surface to the running yarn.

Figure 10:
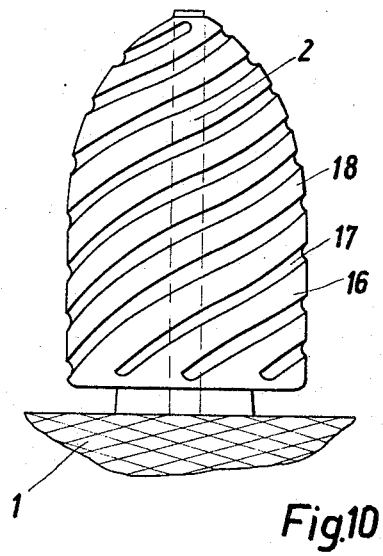

FIG. 10 is a form of construction in which the body 16 mounted on the entry tube has advancing spiral grooves 17 machined into its surface. The portions intervening between the grooves form projecting coils with a flat effective surface.

Figure 11:
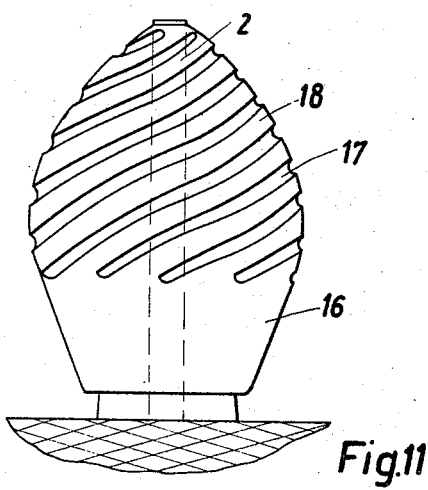

The embodiment according to FIG. 11 differs from that in FIG. 10 exclusively in that the external shape of the body 16 is somewhat different. This latter body permits the entry angle of the yarns into the entry tube 2 to be controlled within limits. Moreover, the angle at which the yarn runs off the bobbins, particularly off the upper bobbin, can also be influenced.

For positively or negatively modifying the action of the coils or windings, the apex of the basic body 16 may be provided with a recess 19 as illustrated in the embodiments according to FIGS. 12 and 13, said recess containing a deflectable member 20 forming the end of the entry tube. This deflectable member follows the throw of the running yarn and it is adapted to perform a circular wobble motion according to the tension of the yarn, because it is formed at the base with a spherical or suitably rounded shape.

The coils or windings proposed by the invention, irrespectively as to their particular form of construction, surprisingly do not affect the yarn tension and hence the smooth running of the yarn. Indeed, the wound form of the aid, which has a pitch rising in the direction of throw of the running yarn has the pronounced effect of assisting and promoting the movement of the yarn from the winding-off bobbin to the entry tube in the direction in which the yarn itself is upwardly pitched. If it is desired to impart a gentle braking effect to the yarn, and this must be very delicately adjusted according to existing conditions, the coils or windings may also be arranged with their turns pitched contrary to the direction of throw of the yarn.

Experience has shown that in every case the further advantage is gained that whenever yarn withdrawal of several yarns is unequal the individual yarns can overtake each other without mutual interference.

What I claim is:

1. An unwinding aid on the yarn entry tube of a double twist spindle, comprising a yarn guiding member having external means superficially thereof winding towards the inlet end of the tube of intersecting and guiding the yarn between the bobbin and the said inlet end.

2. An unwinding aid according to claim 1, in which said yarn guiding means are pitched to wind and rise in the direction of throw of the entering yarn to a smallest diameter at the yarn entry end of said tube.

3. An unwinding aid according to claim, 1, in which said yarn guiding means are pitched to wind and rise in the direction contrary to that of the throw of the yarn to a smallest diameter at the yarn entry end of the tube.

4. An unwinding aid according to claim 1, in which said means are comprised of at least one wire coil.

5. An unwinding aid according to claim 1, in which said means comprise at least one wire or band in the form of a coil on the surface of a conical or conoidal support body.

6. An unwinding aid acording to claim 1, comprising a conical or conoidal body, said external winding means being machined on the surface of said body.

7. An unwinding aid according to claim 1, comprising a conical or conoidal body grooved in its surface to form the said winding means.

8. An unwinding aid according to claim 1, in which said means comprise a plurality of spaced windings.

9. An unwinding aid according to claim 8, in which the said windings are formed by co-axial interwound coils with the turns spaced.

10. An unwinding aid according to claim 8, in which said winding each traverse less than 360° from end to end.

11. An unwinding aid according to claim 10, in which said windings are formed by members laid on the surface of a conical or conoidal body or have been formed by part-spirally groving said surface.

12. An unwinding aid according to claim 1, comprising a conical or conoidal body, said means winding on the peripheral surface thereof, said body comprising a recess in its apex, and a deflectable member that can wobble around the axis of the tube forming the entry for the yarn to the tube.

13. An unwinding aid according to claim 1, in which said winding and tapering means rise from a lower diameter which exceeds the upper diameter of the core tube of the winding-off bobbin.

14. An unwinding aid according to claim 1, said external means being comprised by at least one advancing spiral the bottom diameter of which exceeds the upper diameter of the core tube of the winding-off bobbin and the diameter of the turns of the spiral decreasing towards the end adjacent the yarn entry tube.

15. An unwinding aid according to claim 1, in which said spindle is adapted to carry at least two co-axial bobbins and wherein an aid is situated on the spindle to lie between the said bobbins, the major diameter of said last mentioned aid exceeding the maximum diameter of the core tubes of the said bobbins.

References Cited

UNITED STATES PATENTS

| | | | |
|---|---|---|---|
| 2,672,007 | 3/1954 | Nettelenbos et al. | 57—73 |
| 2,939,268 | 6/1960 | Rehn | 57—58.83 |
| 3,203,642 | 8/1965 | Hirst | 57—106 |
| 3,296,788 | 1/1967 | Franzen | 57—58.83 |

FOREIGN PATENTS 657,647  2/1938  Germany.

OTHER REFERENCES

Volkmann and Co. German DAS No. 1,170,290. Publ. May 14, 1964 p. 2 of spec.

FRANK J. COHEN, *Primary Examiner.*

W. H. SCHROEDER, *Assistant Examiner.*